United States Patent [19]

Amsallen

[11] Patent Number: 5,729,454
[45] Date of Patent: *Mar. 17, 1998

[54] CONTROL SYSTEM/METHOD FOR AUTOMATED MECHANICAL TRANSMISSION SYSTEMS

[75] Inventor: Marcel Amsallen, Kalamazoo, Mich.

[73] Assignee: Eaton Corporation, Cleveland, Ohio

[*] Notice: The term of this patent shall not extend beyond the expiration date of Pat. No. 5,487,004.

[21] Appl. No.: 501,837

[22] Filed: Jul. 13, 1995

Related U.S. Application Data

[62] Division of Ser. No. 143,230, Oct. 29, 1993, Pat. No. 5,487,004.

[51] Int. Cl.⁶ .................. G06G 7/70; F16H 59/48
[52] U.S. Cl. .................. 364/424.08; 364/424.091; 364/424.093; 477/109; 477/120; 74/335
[58] Field of Search .................. 364/424.1, 424.01; 477/125, 120, 155, 154, 124, 129, 905, 78, 74, 75, 123; 74/335, 336 R; 192/3.58, 3.3, 3.29, 3.31

[56] References Cited

U.S. PATENT DOCUMENTS

| | | | |
|---|---|---|---|
| 4,361,060 | 11/1982 | Smyth | 364/424.083 |
| 4,850,236 | 7/1989 | Braun | 74/337 |
| 5,105,357 | 4/1992 | Steeby | 364/424.091 |
| 5,140,871 | 8/1992 | Goto et al. | 364/424.1 |
| 5,261,288 | 11/1993 | Menig | 74/335 |
| 5,425,284 | 6/1995 | Davis | 364/424.1 |
| 5,444,623 | 8/1995 | Genise | 364/424.1 |
| 5,487,004 | 1/1996 | Amsallen | 364/424.1 |

FOREIGN PATENT DOCUMENTS

| | | |
|---|---|---|
| 0410592 | 1/1991 | European Pat. Off. |
| 0449499 | 10/1991 | European Pat. Off. |
| 0473298 | 3/1992 | European Pat. Off. |

*Primary Examiner*—Jacques Louis-Jacques
*Attorney, Agent, or Firm*—Howard D. Gordon

[57] ABSTRACT

A control system (104)/method for a vehicular automated mechanical transmission is provided, which will compare input signals indicative of input shaft speed (IS) to the product of input signals indicative of output shaft speed multiplied by the numerical value of the engaged gear ratio (OS*GR) to develop control parameters indicative of drivetrain torque magnitude and/or phase without requiring a driveline torque transducer.

7 Claims, 7 Drawing Sheets

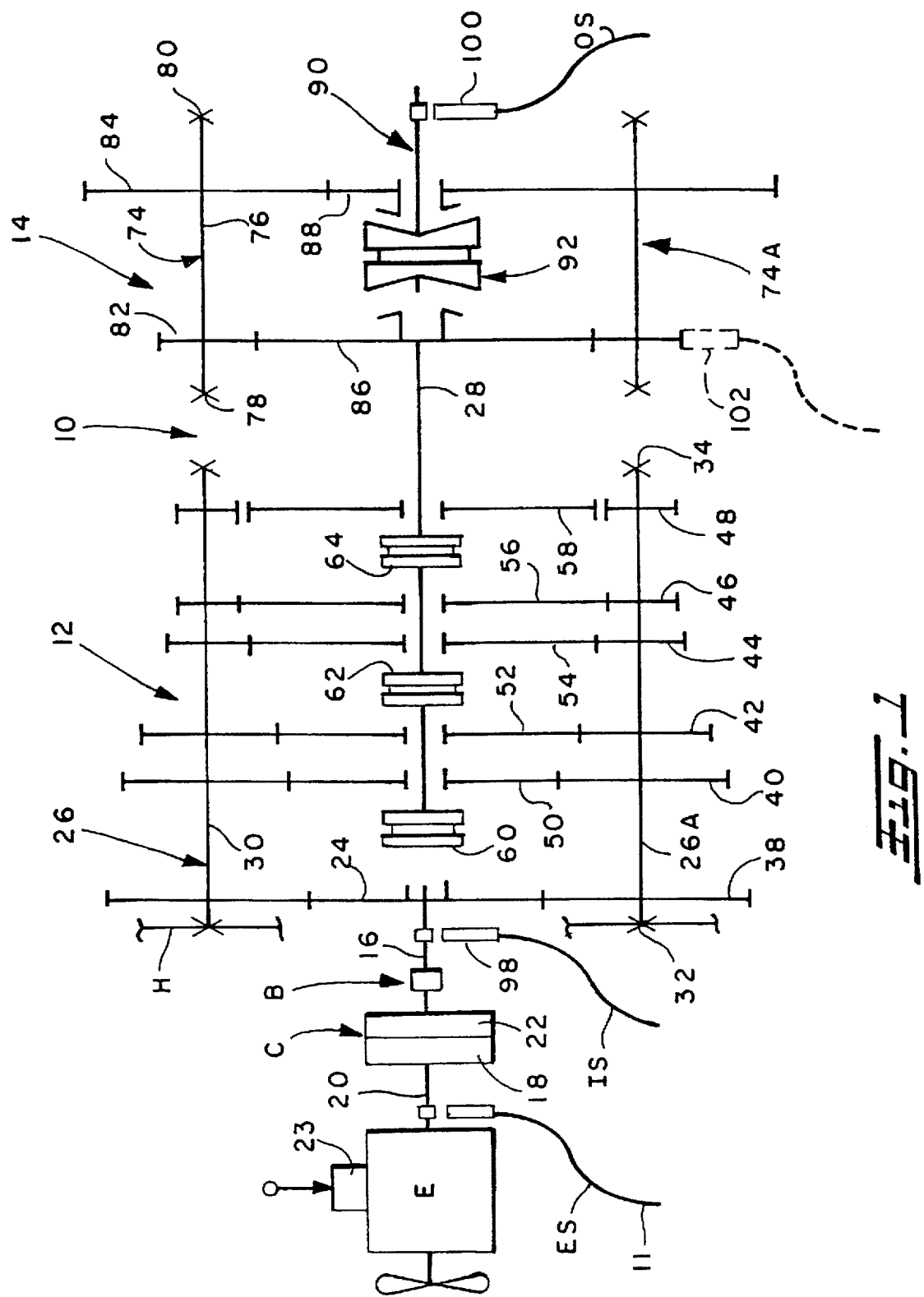

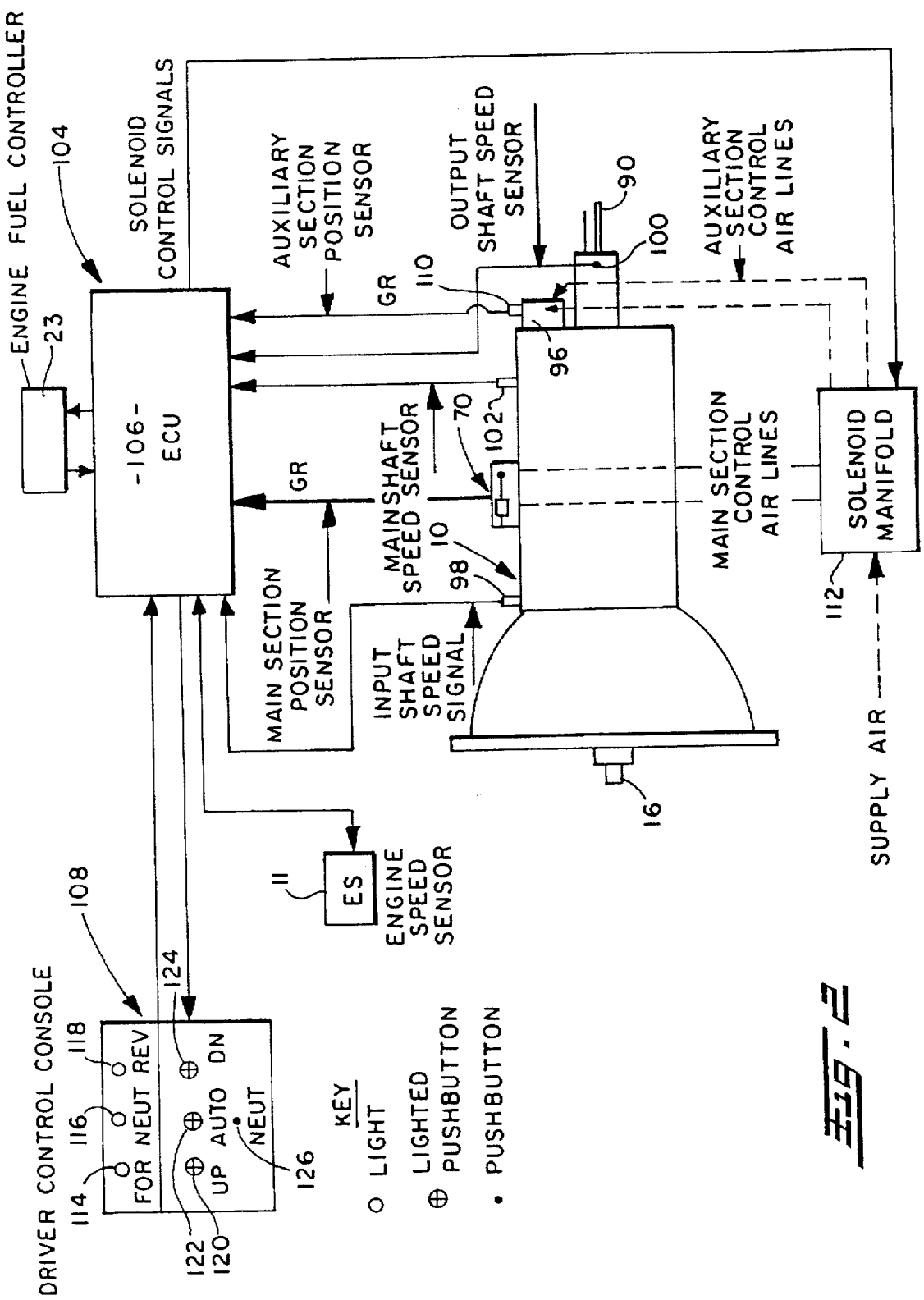

CONTROL SYSTEM/METHOD FOR AUTOMATED MECHANICAL TRANSMISSION SYSTEMS

This is a divisional of application Ser. No. 08/143,230 filed on Oct. 29, 1993 now U.S. Pat. No. 5,487,004.

BACKGROUND OF THE INVENTION

1. Field of the Invention

This invention relates to vehicular automatic or partially automatic mechanical transmission systems and, in particular, to control systems/methods for vehicular fully or partially automated mechanical transmission systems for sensing driveline torque phase, magnitude and/or changes in driveline torque magnitude for control of the transmission system without the use of driveline torque transducers.

More particularly, the preferred embodiment of the present invention relates to an automated mechanical transmission control system/method which enhances shift decisions and/or shaft implementation by monitoring the value of parameters indicative of input shaft speed (IS), output shaft speed (OS) and engaged gear ratio (GR) to determine values indicative of driveline torque phase and/or magnitude of driveline torque and/or change in magnitude of driveline torque.

2. Description of the Prior Art

Fully automatic transmission systems (both for heavy-duty vehicles, such as heavy-duty tracks, and for automobiles) that sense throttle openings or positions, vehicle speeds, engine speeds, transmission shaft speeds and the like, and automatically shift the vehicle transmission in accordance therewith, are well known in the prior art. Such fully automatic change gear transmission systems include automated transmissions wherein pressured fluid is utilized to frictionally engage one or more members to other members or to a ground to achieve a selected gear ratio, as well as automated mechanical transmissions utilizing electronic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Semi-automatic transmission systems utilizing electronic control units which sense throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic transmission systems may be seen by reference to U.S. Pat. Nos. 4,425,620; 4,631,679 and 4,648,290, the disclosures of which are incorporated herein by reference.

Semi-automatic shift implementation systems/methods for mechanical transmission systems for use in vehicles having a manually only controlled engine throttle means and/or a manually only controlled master clutch also have been proposed. Such systems may be seen by reference to U.S. Pat. Nos. 5,053,959; 5,053,961; 5,053,962; 5,063,511; 5,050,079; 5,081,588; 5,089,962 and 5,105,357, the disclosures of which are incorporated herein by reference.

The automated shift selection and/or shift implementation of the above-mentioned fully or partially automated transmission systems may be enhanced if information relative to driveline torque phase and/or magnitude is available, preferably without the additional complication and expense associated with providing a driveline torque transducer or the like.

SUMMARY OF THE INVENTION

In accordance with the present invention, a system/method for detecting values indicative or vehicle driveline torque phase, driveline torque magnitude and/or changes in the magnitude of vehicle driveline torque, without requiring driveline torque transducers, is provided.

The above is accomplished, for vehicle automated transmission systems, preferably automated mechanical transmission systems, having a controller receiving input signals indicative of input shaft speed (IS), output shaft speed (OS and engaged gear ratio (GR), by comparing input shaft speed (IS) to the product of output shaft speed multiplied by the currently engaged gear ratio (OS*GR).

As a vehicle travels, except in steady state down a level highway, it typically is constantly at least slightly accelerating or decelerating, which means that the driveline is constantly winding up or unwinding in both directions. Values indicative of the "phase" of driveline torque can be sensed in these non-steady state conditions by comparing IS to the product of OS*GR. If IS>OS*GR, this is an indication that the engine is driving the vehicle and driveline torque is considered "positive." If IS<OS*GR, this is an indication that the vehicle drive wheels are driving the engine and driveline torque is considered "negative." The magnitude (i.e., absolute value) of the difference between input shaft speed and the product of output shaft speed times gear ratio, |IS−(OS *GR)|, is indicative of the magnitude of driveline torque, while the rate of change of the magnitude of difference between input shaft speed and the product of output shaft speed times engaged gear ratio, d/dt |IS−(OS*GR)|, is indicative of the rate of change of magnitude of driveline torque.

The above driveline torque phase and/or magnitude information, obtained from commonly available IS, OS and GR signals without requiring a driveline torque transducer, may be utilized to enhance the shift decisions and/or shift implementation of a vehicular fully or partially automated mechanical transmission system.

By way of example, for systems wherein shifting from an engaged ratio into neutral is preferably or necessarily accomplished without disengaging the master clutch, the force on the shift actuator may be initiated or increased only upon sensing an impending reversal in the phase of or a reduction in the magnitude of driveline torque as indicators of a predicted non-torque lock condition. As a further example, if the engine is retarding the vehicle (i.e., negative driveline torque phase) while the vehicle is accelerating (d/dt OS>o), this is an indication that the vehicle is traveling downhill under engine braking and that an upshift is not desirable.

By utilizing the difference between input shaft speed and the product of output shaft speed multiplied by the engaged gear ratio as an indication of driveline torque phase and/or the magnitude of driveline torque, the shift decisions and shift implementation of an automated mechanical transmission system may be enhanced without requiring a driveline torque transducer.

This and other objects and advantages of the present invention will become apparent from a reading of the detailed description of the preferred embodiment taken in connection with the attached drawings.

BRIEF DESCRIPTION OF THE DRAWINGS

FIG. 1 is a schematic illustration of the vehicular mechanical transmission system partially automated by the system of the present invention.

FIG. 2 is a schematic illustration of the semi-automatic shift implementation system for a mechanical transmission system of the present invention.

DESCRIPTION OF THE PREFERRED EMBODIMENT

Figure 2A:
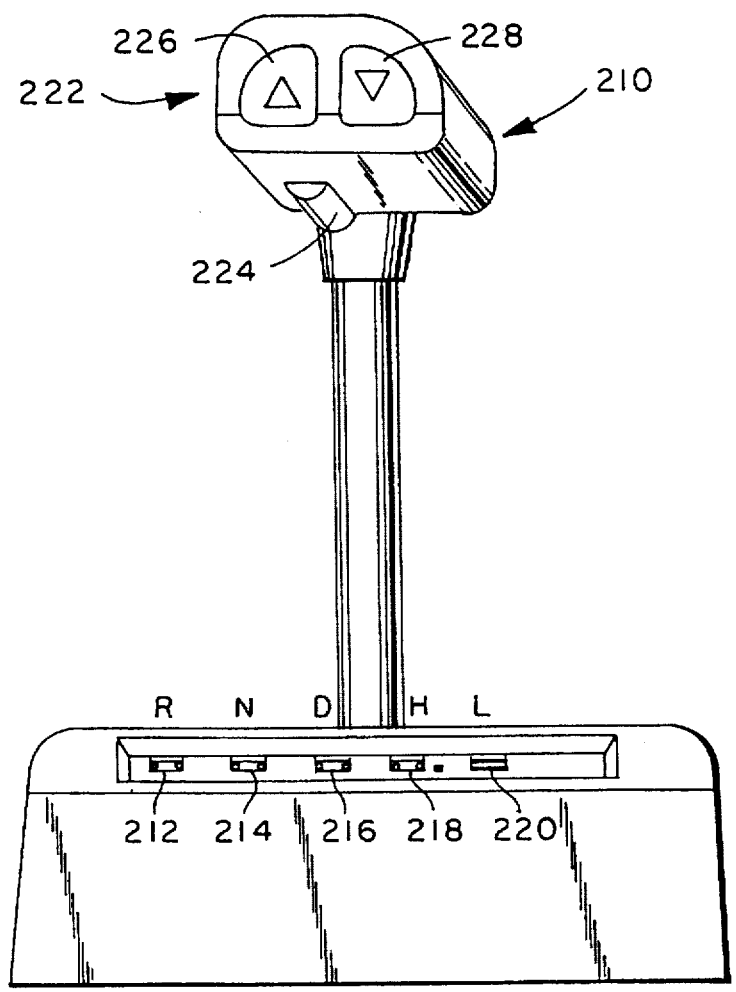
FIG. 2A is an elevational view of an alternate driver control for the transmission system of FIG. 2.

Certain terminology will be used in the following description for convenience in reference only and will not be limiting. The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear," "low gear" and/or "first gear" as used herein, shall all designate the gear ratio utilized for lowest forward speed operation in a transmission or transmission section, i.e., that set of gears having the highest ratio of reduction relative to the input shaft of the transmission.

Referring to FIG. 1, a range type compound transmission 10 of the type partially automated by the semi-automatic mechanical transmission system of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device 23 and the master clutch C is manually controlled by a clutch pedal (not shown) or automatically controlled by a clutch actuator, or the like. An input shaft brake B, usually manually operated by overtravel of the clutch pedal, is preferably provided to provide quicker upshifting as is well known in the prior art.

Transmissions similar to compound mechanical transmission 10 are well known in the prior art and may be appreciated by reference to U.S. Pat. Nos. 3,105,395; 3,283,613; 4,735,109 and 4,754,665, the disclosures of which are incorporated herein by reference. A sensor 11 may be provided for sensing the rotational speed of the engine and providing a signal indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by electric motors or by compressed fluid, such as compressed air, and is of the type automatically controllable by a control unit as may be seen by reference to U.S. Pat. Nos. 4,445,393; 4,555,959; 4,361,060; 4,676,115; 4,873,881 and 4,899,607, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith. Similar transmissions provide 10, 13, 16 or 18 forward speeds as may be seen by reference to U.S. Pat. Nos. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10.

Range section actuator 96 may be of the type illustrated in U.S. Pat. Nos. 3,648,546; 4,440,037 and/or 4,614,126, the disclosures of which are hereby incorporated by reference.

Although the range type auxiliary section 14 is illustrated as a two-speed section utilizing spur or helical type gearing, it is understood that the present invention is also applicable to simple transmissions and to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershift type.

The term "driveline" as used herein includes the engine output shaft 20, the vehicle master clutch C, the input shaft 16, the internal transmission shafts and gears, including mainshaft 28, and the output shaft 90.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed sensor 98, from the output shaft speed sensor 100 (or, alternatively, the mainshaft speed sensor 102) and from the driver control console 108. The ECU 106 may also receive inputs from an auxiliary section position sensor 110.

The raw speed signals are preferably filtered to minimize noise wherein, for example, the filtered speed value Y(N) will equal $SK1*Y(n-1)+SK2*X(N)$ where:

$X(N)$=raw speed value, $SK1=\exp(-WT)$, $SK2=1-SK1$,

W=angular velocity, and

T=a time period.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108. ECU's of this type are well known in the prior art as may be seen by reference to U.S. Pat. No. 4,595,986, the disclosure of which is incorporated herein by reference.

The driver control and display console allows the operator to select a manual or hold mode of operation for manually selecting a shift in a given direction (i.e., upshifts or downshifts) or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

An alternate to the control console 108 is illustrated in FIG. 2A. Briefly, a mode selector 210 is utilized to select reverse (R) 212, neutral (N) 214, drive (automatic) (D) 216, hold (manual) (H) 218 and low (L) 220. The mode selector includes a handle 222 having a reverse interlock release button 224 and upshift 226 and downshift 228 selection buttons. The function of mode selector 210 is substantially identical to console 108 described above.

To implement a selected shift, the manifold 112 is preselected to cause actuator 70 to be biased to shift main transmission section 12 into neutral. This is accomplished by the operator causing a torque break or reversal by manually momentarily decreasing and/or increasing the supply of fuel to the engine and/or manually disengaging the master clutch C. Alternatively, if an automated fuel controller 23 is utilized, a torque break may be caused by manipulation of engine fueling (see U.S. Pat. No. 4,850,236, the disclosure of which is incorporated herein by reference). Preferably, to prevent undue wear on shift actuators, shift forks and the like, the shift actuators will not be preselected to shift into neutral, or will be preselected with only a reduced force, until conditions indicative of a non-torque lock condition are sensed (see U.S. Pat. No. 5,105,357, the disclosure of which is incorporated herein by reference).

As the transmission is shifted into neutral, and neutral is verified by the ECU (neutral sensed for a period of time such as 1.5 seconds), the neutral condition indicia button 116 is lighted. If the selected shift is a compound shift, i.e., a shift of both the main section 12 and of the range section 14, such as a shift from fourth to fifth speeds as seen in FIG. 1, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the automatic preselection mode of operation, selected by use of lighted pushbutton 122, or by moving selector 210 to the "D" position, the ECU will, based upon stored logic rules, currently engaged ratio (which may be calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator or controller may initiate semi-automatic implementation of the automatically preselected shift as indicated above or may cancel the automatic mode by depression of pushbutton 122.

According to the driveline torque phase and magnitude determination strategy of the present invention, values indicative of the phase, magnitude and/or change in magnitude of vehicle driveline torque may be determined without the requirement of a torque transducer, and such values may be used to enhance the shift decisions and/or shift implementation of a vehicular fully or partially automated mechanical transmission system. In automated mechanical transmission systems of the type having a control unit receiving signals indicative of input shaft speed, output shaft speed and currently engaged gear ratio, no additional inputs or sensors are required.

As a vehicle travels, except in steady state down a level highway, it typically is constantly at least slightly accelerating or decelerating, which means that the driveline is constantly winding up or unwinding in both directions. Winding up of the driveline occurs at a change in driveline torque phase as the driveline gear tooth, clutch tooth and spline tooth backlashes are taken up, and as the shafts and gears are resiliently torsionally deformed. During these periods of winding up and unwinding, the rotational speed of the input shaft (IS) will vary slightly (about 10 RPM in a heavy-duty truck driveline) from the product of the output shaft speed multiplied by the currently engaged gear ratio (OS*GR). If the magnitude of difference between IS and the product (OS*GR) exceeds a fault reference (about 25 RPM), this is an indication of a sensor fault and the torque detection strategy of the present invention will be suspended.

The "phase" of driveline torque can be sensed in these non-steady state conditions by comparing IS to the product of OS*GR. If IS>OS*GR, this is an indication that the engine is driving the vehicle and driveline torque is considered "positive." If IS<OS*GR, this is an indication that the vehicle drive wheels are driving the engine and driveline torque is considered "negative." The magnitude of the difference between input shaft speed and the product of output shaft speed times gear ratio, |IS−(OS*GR)|, is indicative of the magnitude of driveline torque while the rate of change of the difference between input shaft speed and the product of output shaft speed times gear ratio, d/dt |IS−(OS*GR)|, is indicative of the rate of change of magnitude of driveline torque.

The above driveline torque phase and/or magnitude information, determined from commonly available IS, OS and GR input signals, without requiring a driveline torque transducer, may be advantageously utilized to enhance the shift decisions and/or shift implementation of a vehicular fully or partially automated mechanical transmission system.

By way of example, for automated mechanical transmission systems wherein shifting from an engaged ratio into neutral is preferably or necessarily accomplished without disengaging the master clutch, the force on the shift actuator may be initiated or increased only upon sensing an impending reversal in the phase of or a reduction in the magnitude of driveline torque as indicators of a predicted non-torque lock condition. As a further example, if the engine is retarding the vehicle (i.e., negative driveline torque phase) while the vehicle is accelerating (d/dt OS>o), this is an indication that the vehicle is traveling downhill under engine braking and that an upshift is not desirable.

Figure 3:
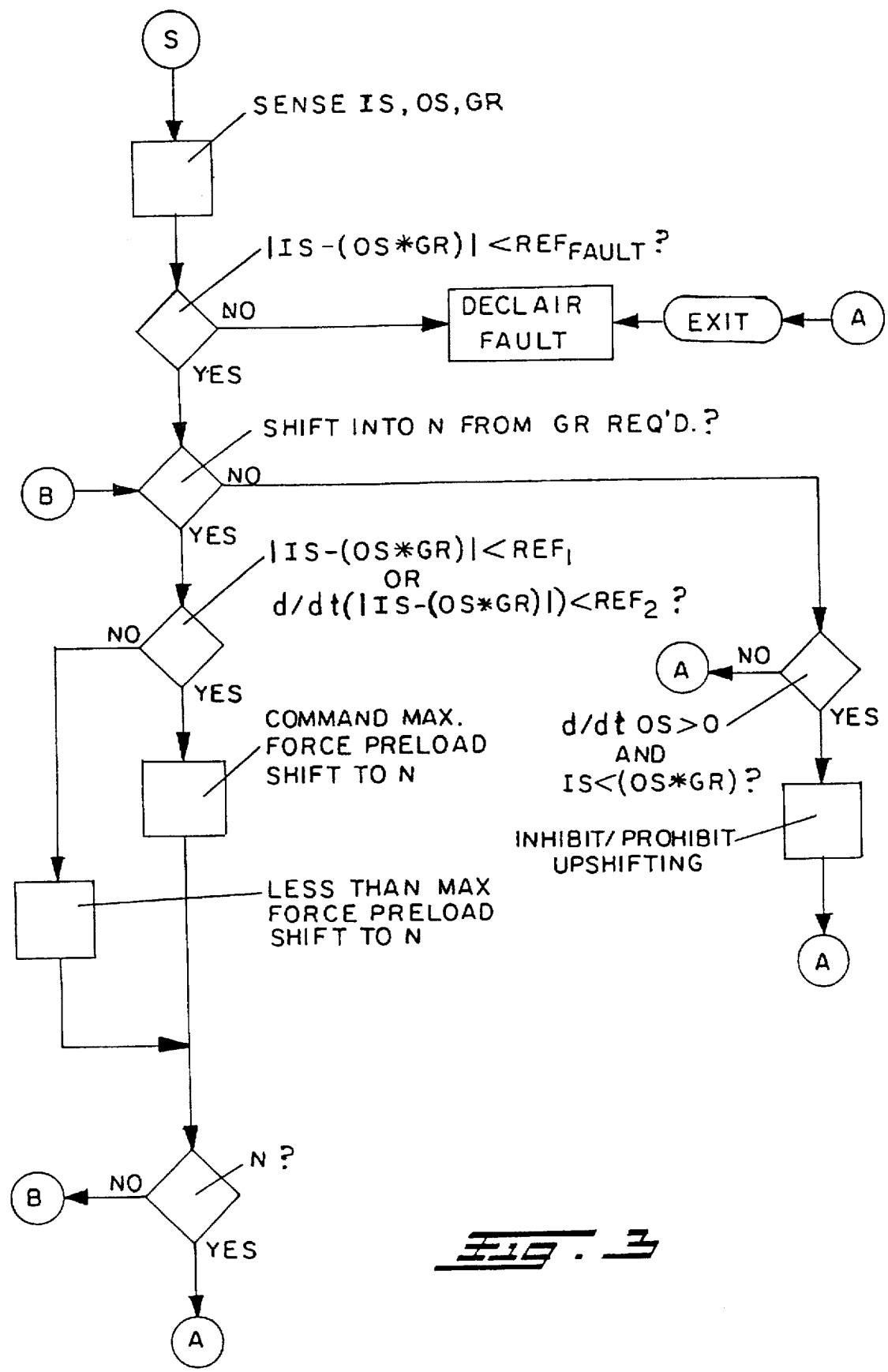
FIG. 3 is a schematic illustration, in flow chart format, of the present invention.

By utilizing the difference between input shaft speed and the product of output shaft speed multiplied by the engaged gear ratio, as an indication of driveline torque phase and/or the magnitude of driveline torque, the shift decisions and shift implementation of an automated mechanical transmission system may be enhanced without requiring a driveline torque transducer. FIG. 3 illustrates, in flow chart format, the logic strategy or subroutine of the present invention.

Figure 4A:
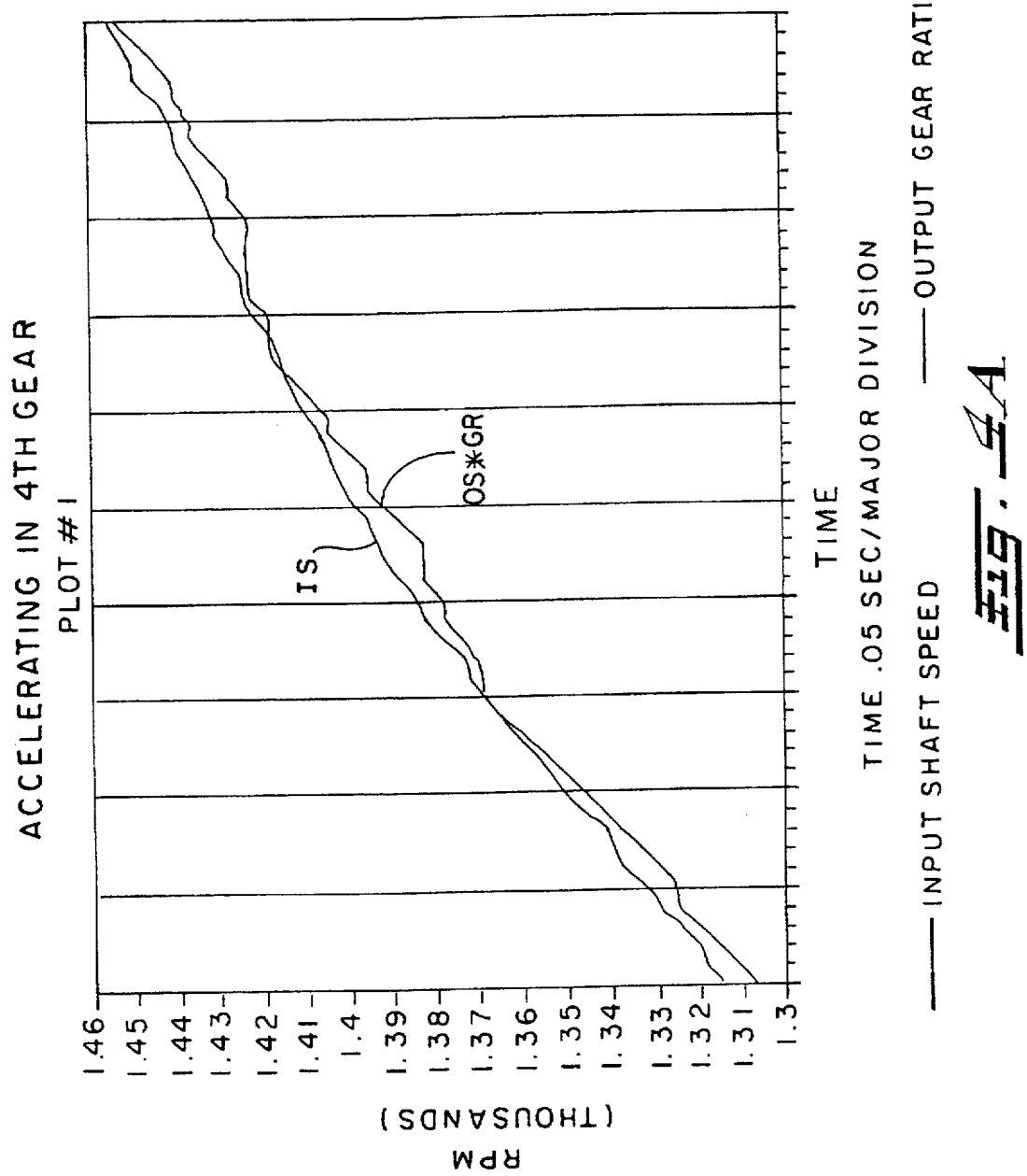
FIGS. 4A, 4B AND 4C are graphical representations of input shaft speed (IS) versus the product of output shaft speed times gear ratio (OS*GR) in various vehicle driving conditions.
Figure 4B:
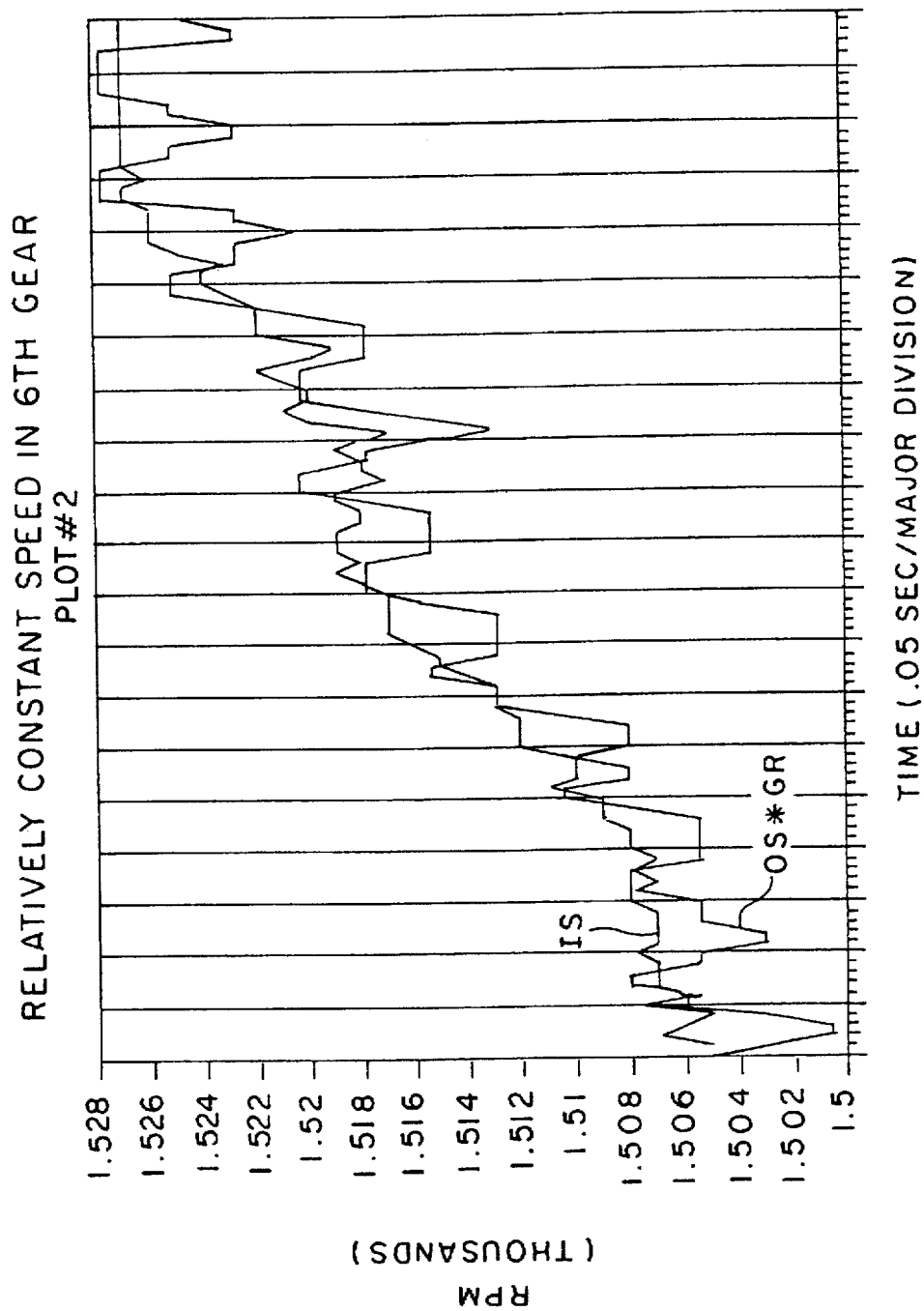
Figure 4C:
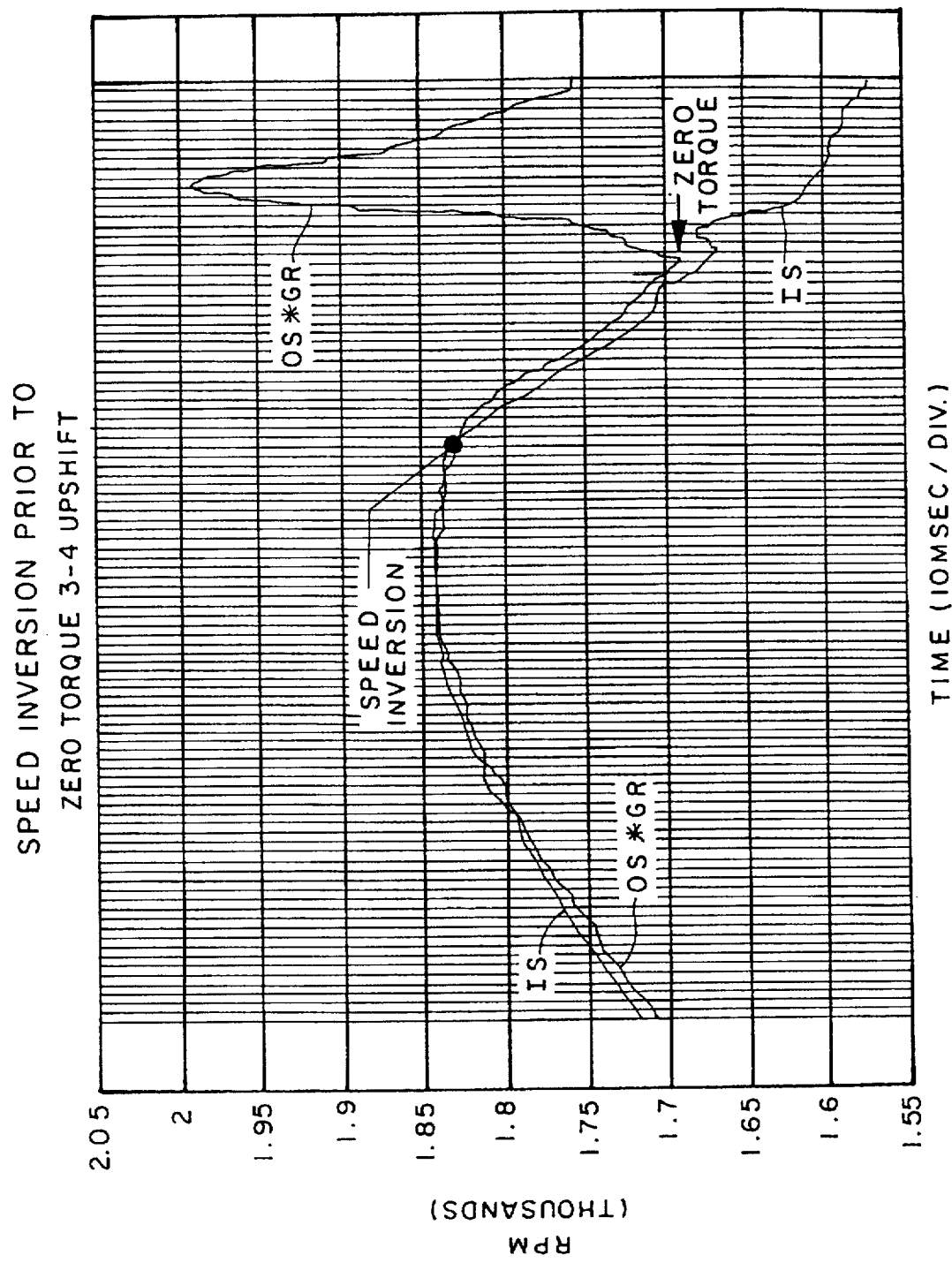

FIGS. 4A, 4B and 4C are typical plots of input shaft speed (IS) versus the product of output shaft speed times the numerical gear ratio (OS*GR) in various vehicle operating conditions.

FIG. 4 illustrates the vehicle accelerating in fourth gear. It may be seen that, with one small exception, IS>(OS*GR) correctly indicates a "positive" driveline torque phase.

FIG. 4B illustrates the vehicle at substantially constant speed in sixth gear. It may be seen that, on average, IS≅(OS*GR) correctly indicates a lack of "positive" or of "negative" driveline torque phase.

FIG. 4C illustrates a third-to-fourth gear ratio upshift. To make an upshift, fueling of the engine is reduced, which causes the torque phase in the driveline to transition from "positive," engine driving the vehicle, through zero, to "negative," vehicle driving the engine.

The transition point can be detected by sensing the point of speed inversion. The transition point occurs before the point of zero torque. Accordingly, to minimize wear on the shift actuators, a shift into neutral, or a full-force shift into neutral, is not initiated until sensing the speed inversion (change in driveline torque phase).

Of course, if the difference between IS and OS*GR exceeds a predetermined magnitude, such as 25 RPM, this is an indication of a speed sensor or ratio sensor fault and the driveline torque phase determination processes may be halted (see U.S. Pat. No. 4,849,899, the disclosure of which is incorporated herein by reference).

Although the present invention has been described with a certain degree of particularity, it is understood that various changes to form and detail may be made without departing from the spirit and the scope of the invention as hereinafter claimed.

I claim:

1. A control system for controlling a vehicular automated change gear transmission system comprising a fuel throttle controlled engine (E), a multispeed change gear transmission (10) having an input shaft (16) and an output shaft (90), said transmission having a plurality of selectably engageable gear ratios (GR), a non-positive coupling (C) drivingly interposed between the engine and the transmission, a first sensor (98) for providing a first input signal (IS) indicative of input shaft rotational speed, a second sensor (100) for providing a second input signal (OS) indicative of output shaft rotational speed, a means (70/110) for determining currently engaged gear ratio and for providing a third input signal indicative thereof (GR), a transmission actuator (112, 70, 96) for controlling shifting of the transmission, and a central processing unit (106) for receiving said first, second and third input signals and for processing same in accordance with predetermined logic rules to issue command output signals, said central processing unit including:

means (i) for comparing said input signal indicative of input shaft speed (IS) to a product of said input signal indicative of output shaft speed multiplied by said determined currently engaged gear ratio (OS*GR) to determine a comparison result value equal to the difference between said input signal indicative of input shaft rotational speed and said product, (ii) for declaring a system fault if an absolute value of said difference exceeds a first reference value (REF$_1$) corresponding to an expected value of said absolute value in the absence of a fault in said first, second or third input signals, and (iii) if said absolute value of said difference does not exceed said first reference value, for controlling said transmission system on the basis of said comparison result value or a rate of change of said comparison result value.

2. The control system of claim 1 wherein said first reference value equals about 25 RPM.

3. A control system (104) for controlling a vehicular automated mechanical change gear transmission system comprising a fuel throttle controlled engine (E), a multispeed change gear mechanical transmission (10) having an input shaft (16) and an output shaft (90), said transmission having a plurality of selectably engageable gear ratios (GR), non-positive coupling (C) drivingly interposed between the engine and the transmission, a first sensor (98) for providing a first input signal (IS) indicative of input shaft rotational speed, a second sensor (100) for providing a second input signal (OS) indicative of output shaft rotational speed, a means (70/110) for providing third input signals indicative of currently engaged gear ratio (GR), a transmission actuator (112, 70, 96) for controlling shifting of the transmission, and a central processing unit (106) for receiving said first, second and third input signals and for processing same in accordance with predetermined logic rules to select upshifts and downshifts from the currently engaged gear ratio and to issue command output signals, said central processing unit including:

means for determining a value indicative of vehicle acceleration (d/OS/dt);

means for comparing said input signal indicative of input shaft speed (IS) to a product of said input signal indicative of output shaft speed multiplied by said currently engaged gear ratio (OS*GR); and means, if an absolute value of the difference between said first input signal and said product is less than a first reference value (|IS−(OS*GR)|<REF$_1$) corresponding to an expected value of said absolute value in the absence of a fault in said first, second or third input signals, for inhibiting upshifts if vehicle acceleration is positive (d/OS/dt>0) and the value indicative of input shaft speed is less than said product (IS<OS*GR).

4. A control system (104) for at least partially automatic implementation of selected shifts of a mechanical change gear transmission system comprising a fuel throttle controlled engine (E), a multispeed change gear mechanical transmission (10) having an input shaft (16) and an output shaft (90) and having a plurality of selectably engageable gear ratios, a non-positive coupling (C) drivingly interposed between the engine and the transmission, a first sensor (98) for providing a first input signal (IS) indicative of input shaft rotational speed, a second sensor (100) for providing a second input signal (OS) indicative of output shaft rotational speed, a third sensor (70/110) for providing a third signal indicative of currently engaged gear ratio, a non-manually controllable transmission actuator (112, 70, 96) for controlling shifting of the transmission, and a central processing unit (106) for receiving said first, second and third input signals and for processing same in accordance with predetermined logic rules to select and implement upshifts and downshifts from the currently engaged gear ratio and to issue command output signals to implement said upshifts and downshifts by a sequence of disengaging a first positive clutch and then engaging a second positive clutch, both of said positive clutches comprising a first clutch member (80, 82, 84) having a rotational speed determined by the rotational speed of the vehicle engine and a second clutch member (86, 88, 90) having a rotational speed determined by vehicle speed, said shift actuator having a first mode of operation wherein a maximum force is applied for disengaging said first positive clutch; said central processing unit including:

logic rules effective for determining a value equal to a difference between said input signal indicative of input shaft rotational speed and the product of said input signal indicative of output shaft rotational speed multiplied by currently engaged transmission ratio, and if an absolute value of the difference between said first input signal and said product is less than a first reference value (|IS−(OS*GR)|<REF$_1$) corresponding to an expected value of said absolute value in the absence of a fault in said first, second or third input signals, upon sensing a selection of a transmission shift from a currently engaged gear ratio, for (i) determining a presence or absence of conditions indicative of non-jaw clutch torque lock conditions as a function of a value of said difference; and (ii) for prohibiting issuing command output signals to said transmission actuator to cause disengagement of said currently engaged transmission ratio in said first mode of operation until it is determined that said conditions indicative of non-jaw clutch torque lock conditions are present.

5. A control method for controlling a vehicular automated change gear transmission system comprising a fuel throttle controlled engine (E), a multispeed change gear transmission (10) having an input shaft (16) and an output shaft (90), said transmission having a plurality of selectably engageable gear ratios (GR), a non-positive coupling (C) drivingly interposed between the engine and the transmission, a first sensor (98) for providing a first input signal (IS) indicative of input shaft rotational speed, a second sensor (100) for providing a second input signal (OS) indicative of output shaft rotational speed, a third sensor (70/110) for determining currently engaged gear ratio and for providing a third input signal indicative thereof (GR), a transmission actuator (112, 70, 96) for controlling shifting of the transmission, and a central processing unit (106) for receiving said first, second and third input signals and for processing same in accordance with predetermined logic rules to issue command output signals, said control method comprising:

(i) comparing said input signal indicative of input shaft speed (IS) to a product of said input signal indicative of output shaft speed multiplied by said determined currently engaged gear ratio (OS*GR) to determine a comparison result value equal to the difference between said input signal indicative of input shaft rotational speed and said product, (ii) for declaring a system fault if an absolute value of said difference exceeds a first reference value ($REF_1$) corresponding to an expected value of said absolute value in the absence of a fault in said first, second or third input signals, and (iii) if said absolute value of said difference does not exceed said first reference value, controlling said transmission system on the basis of said comparison result value or rate of change of said comparison result value.

6. A control method for controlling a vehicular automated mechanical change gear transmission system comprising a fuel throttle controlled engine (E), a multispeed change gear mechanical transmission (10) having an input shaft (16) and an output shaft (90), said transmission having a plurality of selectably engageable gear ratios (GR), non-positive coupling (C) drivingly interposed between the engine and the transmission, a first sensor (98) for providing a first input signal (IS) indicative of input shaft rotational speed, a second sensor (100) for providing a second input signal (OS) indicative of output shaft rotational speed, a third sensor (70/110) for providing third input signals indicative of engaged gear ratio (GR), a transmission actuator (112, 70, 96) for controlling shifting of the transmission, and a central processing unit (106) for receiving said first, second and third input signals and for processing same in accordance with predetermined logic rules to select upshifts and downshifts from the currently engaged gear ratio and to issue command output signals, said control method comprising:

determining a value indicative of vehicle acceleration (d/OS/dt);

comparing said input signal indicative of input shaft speed (IS) to a product of said input signal indicative of output shaft speed multiplied by said currently engaged gear ratio (OS*GR); and if an absolute value of the difference between said first input signal and said product is less than a first reference value (|IS−(OS*GR)|<$REF_1$) corresponding to an expected value of said absolute value in the absence of a fault in said first, second or third input signals, inhibiting upshifts if vehicle acceleration is positive (d/OS/dt>0) and the value indicative of input shaft speed is less than said product (IS<OS*GR).

7. A control method for at least partially automatic implementation of selected shifts of a mechanical change gear transmission system comprising a fuel throttle controlled engine (E), a multispeed change gear mechanical transmission (10) having an input shaft (16) and an output shaft (90) and having a plurality of selectably engageable gear ratios, a non-positive coupling (C) drivingly interposed between the engine and the transmission, a first sensor (98) for providing a first input signal (IS) indicative of input shaft rotational speed, a second sensor (100) for providing a second input signal (OS) indicative of output shaft rotational speed, a third sensor (70/110) for providing a third signal indicative of currently engaged transmission ratio, a non-manually controllable transmission actuator (112, 70, 96) for controlling shifting of the transmission, and a central processing unit (106) for receiving said first, second and third input signals and for processing same in accordance with predetermined logic rules to select and implement upshifts and downshifts from the currently engaged gear ratio and to issue command output signals to implement said upshifts and downshifts by the sequence of disengaging a first positive clutch and then engaging a second positive clutch, both of said positive clutches comprising a first clutch member (80, 82, 84) having a rotational speed determined by the rotational speed of the vehicle engine and a second clutch member (86, 88, 90) having a rotational speed determined by vehicle speed, said shift actuator having a first mode of operation wherein a maximum force is applied for disengaging said first positive clutch; said control method comprising:

determining a value equal to the difference between said input signal indicative of input shaft rotational speed and the product of said input signal indicative of output shaft rotational speed multiplied by currently engaged transmission ratio;

if an absolute value of a difference between said first input signal and said product is less than a first reference value (|IS−(OS*GR)|<$REF_1$) corresponding to an expected value of said absolute value in the absence of a fault in said first, second or third input signals, upon sensing a selection of a transmission shift from a currently engaged ratio, (i) determining a presence or absence of conditions indicative of non-jaw clutch torque lock conditions as a function of a value of said difference; and (ii) prohibiting issuing command output signals to said transmission actuator to cause disengagement of said currently engaged transmission ratio in said first mode of operation until it is determined that said conditions indicative of non-jaw clutch torque lock conditions are present.

* * * * *